Patented June 30, 1931

1,812,243

UNITED STATES PATENT OFFICE

ALOYS JOST, OF THE HAGUE, NETHERLANDS

THERMIC CONTAINER

No Drawing. Application filed March 25, 1930, Serial No. 438,910, and in Belgium April 26, 1929.

It is a known fact that with the crystallization of salts from solution the heat of solution is liberated or absorbed depending upon the salts having a negative or positive heat of solution. Therefore with the crystallization of supersaturated solutions of salts having a negative heat of solution large quantities of heat are liberated which have already been utilized for various purposes particularly for thermic bottles or the like. These known devices are heated in boiling water which causes the salt present in the device to dissolve in a small quantity of water. When put in use the device cools down unto the moment when the crystallization of the salt starts under development of heat.

For this reason these devices retain their heat for a longer period than devices which have only been filled with boiling water. The said crystallization always occurs and cannot be prevented, the devices being sealed with a cork or a stopper with screw-lock and therefore having internally extending parts so that unavoidably minute crystals are formed between the cork and the neck or the screw and the nut which act as kernels initiating the crystallization of the entire salt solution. Therefore said devices are to be used immediately after the heating.

It has also been tried to allow the devices after removal from the boiling water to cool without crystallization occuring said devices then containing a cold supersaturated solution of the respective salt with negative heat of solution and subsequently causing crystallization at the moment the device is intended to be used, for instance by causing air to enter into the device in which case dust-motes from the air and minute crystals act as kernels.

However the above described thermic containers were not satisfactory for after having been used twice or thrice with the cooling even without admittance of air, crystallization started so that the device could only directly be used after dissolving or melting the salt but not as a heat-accumulator.

Now my invention relates to a thermic container consisting in a receptacle containing a salt with negative heat of solution and water, said receptacle being made of a hard inflexible material and hermetically sealed by soldering, the salt solution containing one or more solid bodies, for instance small pebbles, pieces of metal and the like which is known of itself, and optionally a small quantity of a finely divided substance such as sand or the like. By these means an accidental displacement for instance by jerks during the transport of the solid bodies, causing a premature crystallization, is prevented. The thermic container according to my invention continuously retains its property as a heat accumulator and consequently may be used again and again even after having been heated repeatedly in boiling water at the moment it is wanted without premature development of heat occuring by untimely crystallization.

The thermic container according to my invention may be constructed in the following manner: A receptacle with impervious walls e. g. a metallic bottle, tube or the like, which has been internally and externally tinned, enamelled or made impervious by other means is filled with a solution of 92.5 parts by weight of sodium acetate and 7.5 parts by weight of water. In this solution some small particles of gravel or metal are introduced. Subsequently a cover or any other sealing means is soldered or cemented to the receptacle. After this container has been placed for some time in boiling water it is allowed to cool whereafter it is ready for use.

Before use the thermic container is vigorously agitated which causes the sodium acetate to crystallize all at once under development of heat.

When after use the container has become cold it is again placed in boiling water during a short period until the crystals are dissolved. After allowing to cool the thermic container is once more ready to be used for heating purposes after agitation. This treatment may be repeated again and again.

Besides sodium acetate also other salts with negative heat of solution may be used as e. g. sodium thiosulfate, sodium tetrathionate, Glauber salt, potassium cyanate, potassium sulfocyanate, saltpeter, etc.

I claim:

1. A thermic container consisting in a receptacle containing a salt with negative heat of solution and water, said receptacle being made of a hard inflexible material and hermetically sealed by soldering, the salt solution containing at least one solid body.

2. A thermic container consisting in a receptacle containing a salt with negative heat of solution and water, said receptacle being made of a hard inflexible material and hermetically sealed by soldering, the salt solution containing in addition to at least one solid body a small quantity of a finely divided substance.

In testimony whereof I affix my signature.

ALOYS JOST.